United States Patent
Tanaka et al.

[11] Patent Number: 5,521,010
[45] Date of Patent: May 28, 1996

[54] POLYETHYLENE FOR AN INSULATION LAYER OF A POWER CABLE AND A CROSSLINKED POLYETHYLENE INSULATED POWER CABLE USING THE SAME

[75] Inventors: Toshiya Tanaka; Hitoshi Kimura, both of Tokyo; Koji Yamamoto, Yokkaichi; Mitsugu Ishioka, Yokkaichi; Setsuo Goto, Yokkaichi, all of Japan

[73] Assignees: The Furukawa Electric Co., Ltd.; Mitsubishi Chemical Corporation, both of Tokyo, Japan

[21] Appl. No.: 311,528

[22] Filed: Sep. 23, 1994

[30] Foreign Application Priority Data

Mar. 25, 1994 [JP] Japan .................................. 6-055826

[51] Int. Cl.$^6$ ................. B32B 15/00; D02G 3/00
[52] U.S. Cl. ............... 428/379; 428/383; 174/110 PM; 174/120 SR
[58] Field of Search .................... 428/379, 383; 174/120 SR, 110 PM

[56] References Cited

U.S. PATENT DOCUMENTS 3,684,821  8/1972  Miyauchi et al. ............ 174/110 PM
4,400,429  8/1983  Barlow et al. ................... 428/379

FOREIGN PATENT DOCUMENTS 297414  1/1989  European Pat. Off. .
344328  12/1989  European Pat. Off. .

Primary Examiner—Patrick J. Ryan
Assistant Examiner—J. M. Gray
Attorney, Agent, or Firm—Frishauf, Holtz, Goodman, Langer & Chick

[57] ABSTRACT

A polyethylene for an insulation layer of a power cable, of which the dissipation factor never increases even in a high-temperature, high electric field, and a crosslinked polyethylene insulated power cable which uses this polyethylene so that the high-temperature dielectric breakdown voltage is large enough for high-capacitance transmission. This polyethylene is a low-density polyethylene which is synthesized by high-pressure radical polymerization of ethylene, and has properties including: a melt flow rate of 0.1 to 10 g/10 minutes; a density of 0.915 to 0.935 g/cm$^3$; an absorbance of 0.03 to 1.0 for a ketone-type carbonyl group, having a peak in a position corresponding to a wave-number of 1,725±4 cm$^{-1}$ in an infrared absorption spectrum, an absorbance of 1.0 or less for an ester-type carbonyl group, having a peak in a position corresponding to a wave-number of 1,743±4 cm$^{-1}$ and absorbances of less than 0.03 for other carbonyl groups; and/or a content of 3% by weight or less for components eluted at a temperature not lower than an elution temperature T (°C.) calculated as T=687×D−547, where D (g/cm$^3$) is the density of the low-density polyethylene, in a CFC measurement.

3 Claims, 1 Drawing Sheet

POLYETHYLENE FOR AN INSULATION LAYER OF A POWER CABLE AND A CROSSLINKED POLYETHYLENE INSULATED POWER CABLE USING THE SAME

BACKGROUND OF THE INVENTION

1. Field of the Invention

The present invention relates to a polyethylene enjoying outstanding electrical properties even in a high electric field and adapted for use as a material of an insulation layer of a power cable, and a crosslinked polyethylene insulated power cable using the same.

2. Prior Art

Power cables include OF (oil-filled) cables, which use an insulation layer formed of kraft paper or plastic film laminated paper impregnated with insulating oil, and crosslinked polyethylene insulated power cables whose insulation layer is formed of a crosslinked polyethylene.

Among these power cables, the crosslinked polyethylene insulated power cables have come to be widely used, owing to their easy maintenance and smaller dielectric loss. As the fields of their application expand, the working environment advances toward use of higher-voltage classes.

With the progress of the higher-voltage classes of these crosslinked polyethylene insulated power cables, the intensity level of the mean operating electric field rises, and the operating cable temperature becomes higher.

In the case of a crosslinked polyethylene insulated power cable of the 275-kV class, for example, the mean operating electric field is about 6 kV/mm, and the operating temperature becomes as high as about 90° C.

As the operating electric field increases in this manner, the field concentration on defective portions in the insulation layer grows larger than ever, and the field intensity may reach scores of kilovolts per millimeter, in some cases.

When the insulation layer of the crosslinked polyethylene is placed in a high-temperature, high electric field, the dissipation factor (tan δ) increases to produce heat in the insulation layer, so that the dielectric breakdown voltage may lower considerably. Also, the dielectric loss is augmented with the increase of the tan δ, so that the transmission capacity of the power cable may decrease.

In order to maintain high insulating performance for the insulation layer for a long period of time, the tan δ must be kept on a low level even if the applied electric field is about twice as high as the mean operating electric field.

For the manufacture of a crosslinked polyethylene insulated power cable with stable insulating performance and large transmission capacity, therefore, it is necessary to form an insulation layer of a crosslinked polyethylene whose tan δ can be kept low even in a high mean operating electric field.

OBJECTS AND SUMMARY OF THE INVENTION

An object of the present invention is to provide a polyethylene which is available as a material for an insulation layer of a power cable having a mean operating electric field of 10 kV/mm or more at high temperature, enjoying high insulating performance without any increase of the tan δ, and being capable of large capacity transmission.

Another object of the invention is to provide a crosslinked polyethylene insulated power cable having an insulation layer formed of a crosslinked structure of the polyethylene described above.

In order to achieve the above objects, according to an aspect of the present invention, there is provided a polyethylene for an insulation layer of a power cable, which comprises a low-density polyethylene synthesized by radical polymerization of ethylene and having properties as follows:

(a) a melt flow rate (MFR) of 0.1 to 10 g/10 minutes;
(b) a density of 0.915 to 0.935 g/cm$^3$; and
(c) an absorbance of 0.03 to 1.0 for a ketone-type carbonyl group, having a peak in a position corresponding to a wave-number of 1,725±4 cm$^{-1}$, in an infrared absorption spectrum, an absorbance of 1.0 or less for an ester-type carbonyl group, having a peak in a position corresponding to a wave-number of 1,743±4 cm$^{-1}$, and absorbances of less than 0.03 for other carbonyl groups.

According to another aspect of the invention, there is provided a polyethylene for an insulation layer of a power cable, which comprises a low-density polyethylene synthesized by radical polymerization of ethylene and having properties as follows:

(a) an MFR of 0.1 to 10 g/10 minutes;
(b) a density of 0.915 to 0.935 g/cm$^3$; and
(d) a content of 3% by weight or less for components eluted at a temperature not lower than an elution temperature T (°C.) calculated as $$T = 687 \times D - 547, \qquad (1)$$

where D (g/cm$^3$) is the density of the low-density polyethylene, in a measurement by means of a cross-fractionation chromatograph being operated by combining elevated-temperature elution fractionation and gel permeation chromatography.

According to still another aspect of the invention, there is provided a polyethylene for an insulation layer of a power cable, which comprises a low-density polyethylene synthesized by radical polymerization of ethylene and having properties as follows:

(a) an MFR of 0.1 to 10 g/10 minutes;
(b) a density of 0.915 to 0.935 g/cm$^3$;
(c) an absorbance of 0.03 to 1.0 for a ketone-type carbonyl group, having a peak in a position corresponding to a wave-number of 1,725±4 cm$^{-1}$, in an infrared absorption spectrum, an absorbance of 1.0 or less for an ester-type carbonyl group, having a peak in a position corresponding to a wave-number of 1,743±4 cm$^{-1}$, and absorbances of less than 0.03 for other carbonyl groups; and
(d) a content of 3% by weight or less for components eluted at a temperature not lower than an elution temperature T (°C.) calculated as T=687×D−547, where D (g/cm$^3$) is the density of the low-density polyethylene, in a measurement by means of a cross-fractionation chromatograph being operated by combining elevated-temperature elution fractionation and gel permeation chromatography.

According to a further aspect of the invention, there is provided a crosslinked polyethylene insulated power cable having an insulation layer formed of crosslinked polyethylene, the polyethylene used being one of the aforementioned three polyethylenes.

DETAILED DESCRIPTION OF THE INVENTION

Figure 1:
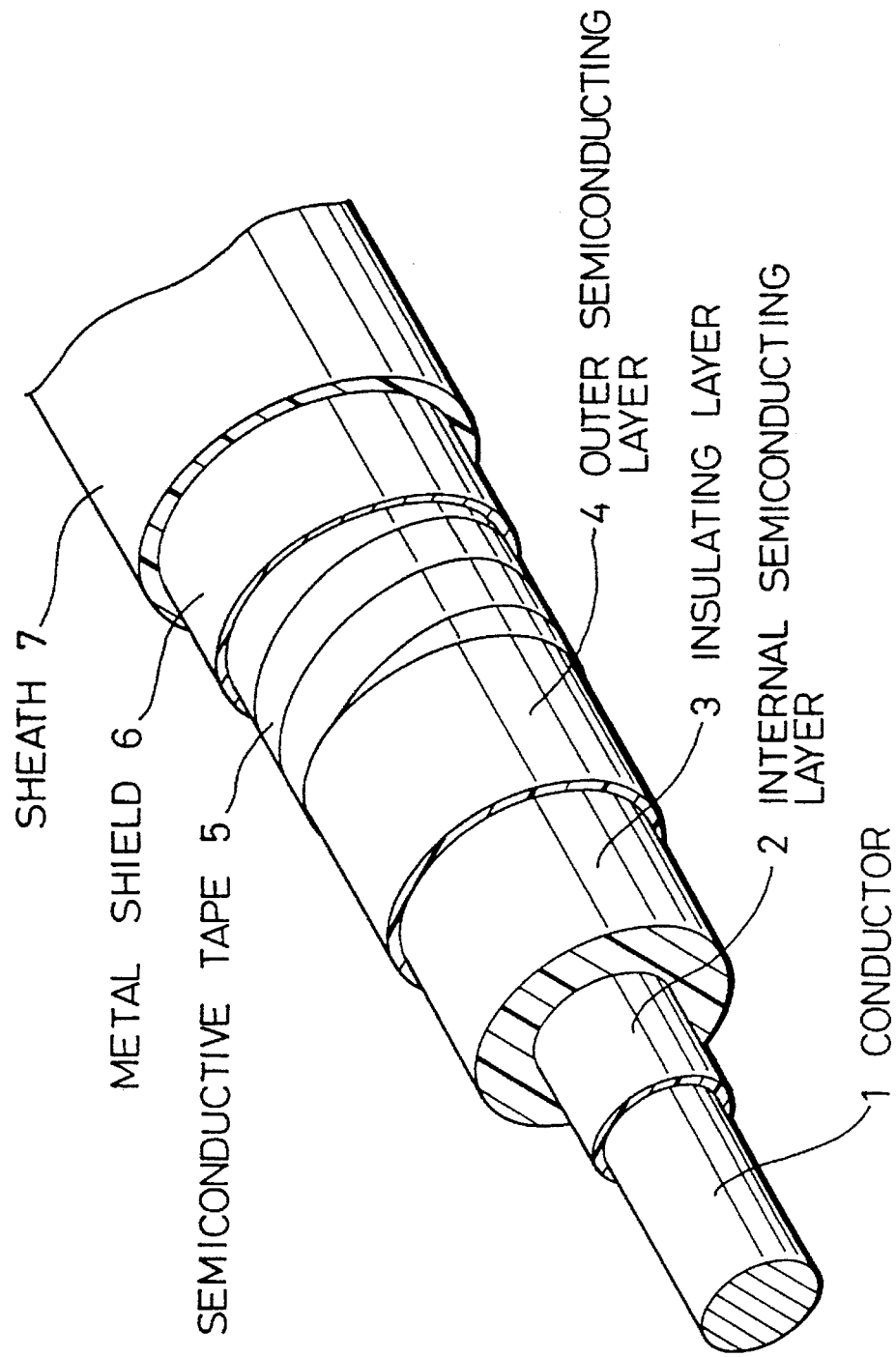
FIG. 1 is a partly cutaway prospective view of a cable according to the present invention.

FIG. 1 shows a cutaway perspective view of the cable of the present invention, wherein a conductor 1 is covered with three layers, i.e., an internal semiconducting layer 2, an insulation layer 3, and an outer semiconducting layer 4, in the order named. The polyethylene of the present invention is used in the insulation layer among these three layers. A semiconductive tape 5 is applied over the external semiconducting layer 4, and a metal shield 6 and a sheet 7 are provided, in sequence, to the power cable.

Any of the low-density polyethylenes described above has its MFR (melt flow rate) ranging from 0.1 to 10 g/10 minutes, preferably from 0.7 to 5 g/10 minutes, and more specifically from 0.8 to 3 g/10 minutes.

In the case of a polyethylene with too high MFR, its melt tension is so low that an extruded polyethylene insulation layer is unlikely to be deformed during crosslinking process. In the case of a polyethylene with too low MFR, on the other hand, it is hard to coat a conductor with the insulation layer by melt extrusion, so that the productivity is low. The MFR used herein is a value measured in accordance with JIS-K7210 under the conditions of the temperature 190° C. and the load 2.16 kg.

Moreover, the low-density polyethylenes have their density ranging from 0.915 to 0.935 g/cm$^3$, preferably from 0.917 to 0.928 g/cm$^3$, and more specifically from 0.918 to 0.924 g/cm$^3$.

In the case of a polyethylene with too high density, the flexibility of the formed insulation layer is so worsened that the resulting power cable lacks in handling properties in practical use. It is hard practically to use a polyethylene with too low density, since it contains too much viscous components.

The density used herein is a value measured in accordance with JIS-K7112 under the condition of the temperature 23° C.

Furthermore, the low-density polyethylenes according to the present invention have a property (c) such that the absorbance of a ketone-type carbonyl group, having its peak in a position corresponding to a wave-number of 1,725±4 cm$^{-1}$, ranges from 0.03 to 1.0, preferably from 0.03 to 0.5, in an infrared absorption spectrum measurement with a wave-number resolution of 4 cm$^{-1}$ or more, the absorbance of an ester-type carbonyl group, having its peak in a position corresponding to a wave-number of 1,743±4 cm$^{-1}$, is 1.0 or less preferably 0.5 or less, the peak in the position corresponding to the wave-number of 1,743±4 cm$^{-1}$ being not essential, and the absorbances of other carbonyl groups are less than 0.03, preferably have no peaks. This property (c) hardly changes even though the polyethylenes are crosslinked.

The absorbance used herein is a value for 1 mm in thickness of a measurement sample (polyethylene), and is expressed in –/mm.

In an insulation layer formed by using a polyethylene which does not fulfill the requirements for the property (c), the tanδ increases particularly in a high-temperature, high electric field, under the influence of the carbonyl groups, so that the dielectric loss of the insulation layer is increased, thereby lowering the transmission capacity of the resulting power cable. In the case of the power cable of this type, moreover, the high-temperature dielectric breakdown voltage is reduced considerably by heat release attributable to the increase of the tanδ.

The low-density polyethylenes according to the present invention also have a property (d) such that the content of components eluted at a temperature not lower than the elution temperature T calculated according to equation (1) is 3% or less, preferably 1.5% or less, of the total quantity of eluate by weight, in the relationship between the elution temperature T and the density D of the low-density polyethylene, in a measurement by means of a cross-fractionation chromatograph (hereinafter referred to as CFC) which is operated by combining elevated-temperature elution fractionation and gel permeation chromatography for the aforesaid low-density polyethylenes.

The CFC measurement according to the present invention is conducted by using a commercially available device in the following manner. Based on a principle described in J. Appl. Polym. Sci., 26, 4217 (1981), a polyethylene as an object of measurement is first all dissolved at 140° C., and then cooled from 140° C. to 0° C. at a rate of 1° C./min. After the polyethylene is kept at 0° C. for 30 minutes, it is measured in the conditions mentioned later. In this measurement, the temperature of the polyethylene is raised stage by stage, and the concentration of the eluted components are detected at the temperature in each stage. The component distribution of the polyethylene is determined by plotting the relationships between the eluate quantity and the elution temperature.

In an insulation layer formed by using a polyethylene which does not fulfill the requirements for the property (d), the tanδ increases particularly in a high-temperature, high electric field, so that the dielectric loss of the insulation layer is increased, thereby lowering the transmission capacity of the resulting power cable. Moreover, the high-temperature dielectric breakdown voltage is reduced considerably by heat release attributable to the increase of the tanδ.

Accordingly, in an ultrahigh-voltage power cable operated in the high-temperature, high electric field, a polyethylene having both of the properties (c) and (d) should preferably be used as a resin for the insulation layer.

Moreover, the polyethylenes for an insulation layer of a power cable according to the present invention should preferably be formed so that the ratio S is 8% or less, preferably 7% or less, and more specifically 6% or less, in the CFC measurement, wherein S value means $(S_H/S_A) \times 100$; in %. $S_H$ means a high-temperature-side area of a region surrounded by a differential elution curve which is indicative of the relationships between the elution temperature and the eluate quantity, and a tangent to this curve at half the height of the peak thereof. $S_A$ means the overall area for the peak.

The polyethylenes according to the present invention can be synthesized by a conventional method which is described in, for example, Chem. Eng., 113 Dec. (19), 1966.

More specifically, an ethylene gas refined in an ethylene plant and an unreacted ethylene gas circulated from a reactor in the manner mentioned later are first introduced into a primary compressor, whereupon they are compressed to about 200 kg/cm$^2$, and then delivered into a secondary compressor.

In this secondary compressor, the gas mixture, along with an unreacted ethylene gas circulated from a reactor mentioned later, is compressed to about 1,500 to 3,500 kg/cm$^2$, and then forced together with a radical initiator or the like into a reactor. In this reactor, radical polymerization is advanced at a maximum reaction temperature of 150° to 350° C.

At this time, only about 18 to 20% of the introduced gases are polymerized, so that the synthesized polymer and the unreacted ethylene gas are separated by means of a high-pressure separator being operated under the pressure of about 200 kg/cm$^2$, and then by means of a low-pressure separator being operated under the pressure of about 0.3 kg/cm$^2$.

The unreacted ethylene gas separated by means of the high-pressure separator is returned to the secondary compressor, while the unreacted ethylene gas separated by means of the low-pressure separator is circulated through a surge tank and the compressor, and is partially returned to an ethylene refining system. The remainder of this ethylene gas, along with the refined ethylene gas, is returned to the primary compressor.

The polymer separated by means of the low-pressure separator is reduced to pellets by means of a pelletizer, and these pellets are used as the polyethylene material according to the present invention.

The power cable according to the present invention shown in FIG. 1, uses a high-pressure-low-density polyethylene synthesized in this manner, having the properties (a), (b), (c) and/or (d) as its base resin, which is compounded with an organic peroxide, such as benzoyl peroxide, tert-butyl peroxy benzoate, dicumyl peroxide, tert-butyl cumyl peroxide, di-tert-butyl peroxide, 2,5-dimethyl-2,5-di-tert-butyl peroxy hexene, 2,4-dichloro- benzoyl peroxide, etc., as a crosslinking agent. A conductor 1 is coated with the resulting intimate mixture by melt extrusion so that the mixture forms an uncrosslinked insulation layer 3, which is then crosslinked by a conventional crosslinking method, such as gas curing process or horizontal long-land dies curing process. By doing this, the high-pressure, low-density polyethylene can be manufactured in the form of a crosslinked version.

Example 1

Based on the method described in Chem. Eng., 113 Dec. (19), 1966, a polyethylene was synthesized in the following conditions:

Reactor: tubular reactor,

Reaction pressure: 2,800 kg/cm$^2$,

Maximum reaction temperature: 280° C.,

Ethylene feed rate: 35 kg/hr,

Polymerization initiator: tert-butyl peroxy benzoate,

Initiator feed rate: 1.45 g/hr.

The resulting polyethylene was subjected to the CFC measurement, MFR measurement, density measurement, and IR analysis as follows: CFC measurement:

Apparatus: CFCT-150A (from Mitsubishi Petrochemical Co., Ltd.),

Solvent: o-dichlorobenzene,

Flow rate: 1 ml/min.,

Concentration: 4 mg/ml,

Injection volume: 0.4 ml,

Column: AD80M/S, three in number (from Showa Denko K.K.),

Elution temperature: 0° C., 5° C., 10° C., 20° C., 30° C., 40° C., 45° C., 49° C., 52° C., 55° C., 58° C., 61° C., 64° C., 67° C., 70° C., 73° C., 76° C., 79° C., 82° C., 85° C., 88° C., 91° C., 94° C., 97° C., 100° C., 120° C., 140° C., Elution time: 39 minutes, Detector: infrared spectrophotometer, Detection wavelength: 3.42 μm. MFR measurement: based on JIS-K7210, measured at 190° C. with a load of 2.16 kg applied, Density measurement: based on JIS-K7112, measured at 23° C. IR analysis (identification of carbonyl groups in polyethylene): measurement in conditions including wave-number resolution of 4 cm$^{-1}$, 64 scans, and sample thickness of about 1 mm, using Series-1600 FT-IR from Perkin-Elmer Co., Ltd., and determination of the presence of peaks and absorbance for wave-numbers shown in Table 1.

Table 1 shows the results of these measurements.

One hundred parts by weight of this polyethylene was compounded with 2 parts by weight of dicumyl peroxide (crosslinking agent) and 0.3 part by weight of 4,4'-thiobis-(6-tert-butyl-3-methylphenol) (antioxidant), and a 150-mm$^2$ conductor 1 (see FIG. 1) was coated with the resulting intimate mixture as an insulation layer 3, along with internal and external semiconducting layers 2, 4, respectively, by melt extrusion, and these three layers were then crosslinked by heating at the temperature of 230° C. for 30 minutes under N$_2$ gas pressure of 15 kg/cm$^2$ to provide a core of the power cable. Subsequently the core was covered with a semiconductive tape 5, a metal shield 6 and a sheath 7 in sequence to complete a power cable.

Values of the tanδ for this power cable were measured for mean electric field of 5 kV/mm, 10 kV/mm, 15 kV/mm, 20 kV/mm, and 25 kV/mm, at room temperature and at 90° C. An automatic shearing bridge (Model DAU-PSC-UA) from Soken Denki Co., Ltd. was used as a measuring device, the measurement frequency was adjusted to 50 Hz.

Table 1 shows the results of this measurement.

Example 2

A polyethylene was synthesized in the same manner as in Example 1 except that the conditions for the radical polymerization were given as follows:

Reactor: autoclave reactor,

Reaction pressure: 2,000 kg/cm$^2$,

Maximum reaction temperature: 235° C.

Ethylene feed rate: 45 kg/hr, Polymerization initiators: tert-butyl peroxy isobutyrate and tert-butyl peroxypropyl carbonate, Initiator feed rate: 1.28 g/hr.

A power cable was manufactured in the same conditions of Example 1 by using the resulting polyethylene.

This polyethylene was subjected to the CFC measurement, MFR measurement, density measurement, IR analysis, and tanδ measurement for the power cable in the same manner as in Example 1. Table 1 shows the results of these measurements.

Examples 3 & 4, Comparative Examples 1 to 4

Power cables were manufactured in the same manner as in Example 1 except for the use of polyethylenes having the properties shown in Table 1, and were evaluated. Table 1 show the results of the evaluation.

In the power cables manufactured with use of the polyethylenes according to the present invention, as seen from Table 1, the tanδ hardly increases at high temperature even when the mean electric field is 25 kV/mm, not to mention 20 kV/mm. Therefore, the power cables according to the invention can secure prolonged stability of insulating performance even in ultrahigh-voltage transmission using a mean operating electric field of 10 kV/mm or more.

Thus, according the power cables whose insulation layers are formed of the crosslinked polyethylenes based on the polyethylenes of the present invention, the tanδ hardly increases even in a high-temperature, high electric field. Accordingly, the high-temperature dielectric breakdown voltage is so large that the power cables according to the invention can function as high-transmission cables. This is an effect produced by the aforementioned properties (a), (b), (c) and/or (d) of the polyethylenes of the invention.

a temperature not lower than an elution temperature T (°C.) calculated as T=687× D–547, where D (g/cm$^3$) is the density of the low-density polyethylene, in a measurement by means of a cross-fractionation chromatograph being operated by combining elevated-temperature elution fractionation and gel permeation chromatography and wherein said polyethylene has been crosslinked.

TABLE 1

|  |  |  | Example No. |  |  |  | Comparative Example No. |  |  |  |
| --- | --- | --- | --- | --- | --- | --- | --- | --- | --- | --- |
|  |  |  | 1 | 2 | 3 | 4 | 1 | 2 | 3 | 4 |
| Properties of Polyethylene |  |  |  |  |  |  |  |  |  |  |
| MFR (g/10 minutes) |  |  | 1.1 | 1.2 | 2.0 | 1.0 | 1.5 | 1.0 | 2.0 | 1.0 |
| Density (D:g/cm$^3$) |  |  | 0.920 | 0.924 | 0.922 | 0.922 | 0.926 | 0.920 | 0.928 | 0.922 |
| Absorbance (–/mm) | Wave-number (cm$^{-1}$) | 1720 | no peak | no peak | no peak | no peak | no peak | 0.10 | 0.87 | 0.07 |
|  |  | 1725 | 0.10 | 0.10 | 0.20 | 0.03 | no peak | no peak | no peak | no peak |
|  |  | 1730 | no peak | no peak | no peak | no peak | no peak | 0.10 | 0.03 | no peak |
|  |  | 1743 | no peak | no peak | no peak | 0.27 | 3.1 | no peak | no peak | 0.07 |
| Results of CFC Measurement | Value T (°C.: 687 × D-547) |  | 85.0 | 87.8 | 86.4 | 86.4 | 89.2 | 85.0 | 90.5 | 86.4 |
|  | Eluate quantity at T or above (% by wt.) |  | 0.5 | 0.4 | 0.3 | 0.3 | 3.1 | 3.5 | 2.0 | 2.5 |
| S Value (%) |  |  | 5.5 | 3.5 | 4.0 | 5.0 | 7.9 | 8.9 | 7.8 | 8.0 |
| Properties of Power Cable |  |  |  |  |  |  |  |  |  |  |
| tan δ (%) | Mean Electric Field 5 kV/mm | Room Temperature | 0.01 | 0.01 | 0.02 | 0.01 | 0.06 | 0.01 | 0.05 | 0.02 |
|  |  | 90° C. | 0.01 | 0.02 | 0.02 | 0.02 | 0.03 | 0.02 | 0.03 | 0.01 |
|  | Mean Electric Field 10 kV/mm | Room Temperature | 0.01 | 0.01 | 0.01 | 0.01 | 0.06 | 0.01 | 0.05 | 0.01 |
|  |  | 90° C. | 0.01 | 0.02 | 0.01 | 0.01 | 0.04 | 0.03 | 0.04 | 0.02 |
|  | Mean Electric Field 15 kV/mm | Room Temperature | 0.01 | 0.02 | 0.02 | 0.01 | 0.07 | 0.01 | 0.06 | 0.02 |
|  |  | 90° C. | 0.01 | 0.03 | 0.02 | 0.02 | 0.04 | 0.04 | 0.05 | 0.05 |
|  | Mean Electric Field 20 kV/mm | Room Temperature | 0.02 | 0.03 | 0.02 | 0.02 | 0.08 | 0.02 | 0.07 | 0.02 |
|  |  | 90° C. | 0.02 | 0.03 | 0.03 | 0.03 | 0.09 | 0.10 | 0.12 | 0.09 |
|  | Mean Electric Field 25 kV/mm | Room Temperature | 0.02 | 0.03 | 0.03 | 0.02 | 0.09 | 0.02 | 0.07 | 0.02 |
|  |  | 90° C. | 0.03 | 0.03 | 0.04 | 0.03 | 0.12 | 0.14 | 0.18 | 0.12 |

What is claimed is:

1. A crosslinked polyethylene insulation power cable, wherein the mean operating electric field is at 10 kV/mm or more, and the polyethylene is a low-density polyethylene synthesized by radical polymerization of ethylene and having properties as follows:

(a) a melt flow rate of 0.1 to 10 g/10 minutes;

(b) a density of 0.915 to 0.935 g/cm$^3$; and (c) an infrared absorption spectrum with:

(i) an absorbance of 0.03/mm to 1.0/mm for a ketone-type carbonyl group, having a peak in a position corresponding to a wave-number of 1,725±4 cm$^{-1}$, (ii) an absorbance of 1.0/mm or less for an ester-type carbonyl group, having a peak in a position corresponding to a wave-number of 1,743±4 cm$^{-1}$ and (iii) absorbances of less than 0.03/mm for other carbonyl groups and wherein said polyethylene has been crosslinked.

2. A crosslinked polyethylene insulated power cable, wherein the mean operating electric field is at 10 kv/mm or more, and the polyethylene is a low-density polyethylene synthesized by radical polymerization of ethylene and having properties as follows:

(a) a melt flow rate of 0.1 to 10 g/10 minutes;

(b) a density of 0.915 to 0.935 g/cm$^3$; and (d) a content of 3% by weight or less of components which are eluted from the low density polyethylene at a temperature not lower than an elution temperature T (°C.) calculated as T=687×D–547, where D (g/cm$^3$) is the density of the low-density polyethylene, in a measurement by means of a cross-fractionation chromatograph being operated by combining elevated-temperature elution fractionation and gel permeation chromatography and wherein said polyethylene has been crosslinked.

3. A crosslinked polyethylene insulated power cable, wherein the mean operating electric field is at 10 kv/mm or more, and the polyethylene is a low-density polyethylene synthesized by radical polymerization of ethylene and having properties as follows:

(a) a melt flow rate of 0.1 to 10 g/10 minutes;

(b) a density of 0.915 to 0.935 g/cm$^3$;

(c) an infrared absorption spectrum with:

(i) an absorbance of 0.03/mm to 1.0/mm for a ketone-type carbonyl group, having a peak in a position corresponding to a wave-number of 1,725±4 cm$^{-1}$, (ii) an absorbance of 1.0/mm or less for an ester-type carbonyl group, having a peak in a position corresponding to a wave-number of 1,743±4 cm$^{-1}$, and (iii) absorbances of less than 0.03/mm for other carbonyl groups; and (d) a content of 3% by weight or less of components which are eluted from the low density polyethylene at a temperature not lower than an elution temperature T (°C.) calculated as T=687×D–547, where D (g/cm$^3$) is the density of the low-density polyethylene, in a measurement by means of a cross-fractionation chromatograph being operated by combining elevated-temperature elution fractionation and gel permeation chromatography and wherein said polyethylene which has been crosslinked.

* * * * *